United States Patent [19]

McMahan

[11] 4,385,390
[45] May 24, 1983

[54] LASER BYPASS INHIBITOR

[75] Inventor: William H. McMahan, Salt Lake City, Utah

[73] Assignee: American Laser Corporation, Salt Lake City, Utah

[21] Appl. No.: 232,539

[22] Filed: Feb. 9, 1981

[51] Int. Cl.³ .............................................. H01S 3/03
[52] U.S. Cl. ...................................... 372/63; 372/61; 372/33
[58] Field of Search ................................... 372/62, 63

[56] References Cited

U.S. PATENT DOCUMENTS 3,670,262  6/1972  Hallock et al. ........................ 372/62

Primary Examiner—William L. Sikes
Assistant Examiner—C. J. Britton
Attorney, Agent, or Firm—B. B. Olive

[57] ABSTRACT

An improved bypass inhibitor attached to but not constituting part of the laser bore assembly of a ceramic gas laser tube having main and gas bypass bores comprises a ceramic disc, one side of which is both metal bonded to the tube and formed with metal surface channels to reduce bypass gas ignition without significantly inhibiting bypass gas passage therethrough.

6 Claims, 4 Drawing Figures

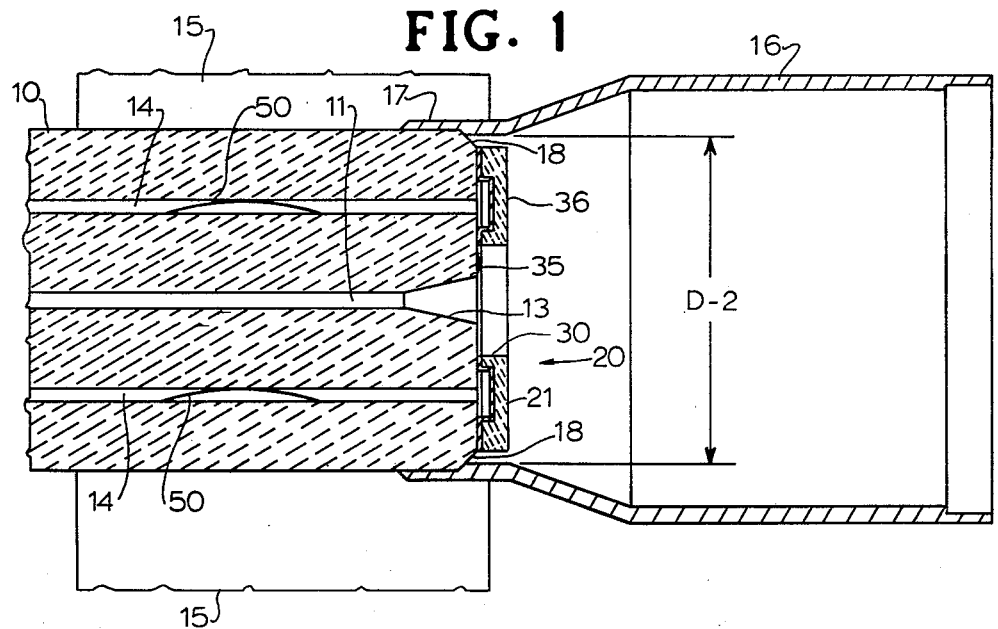
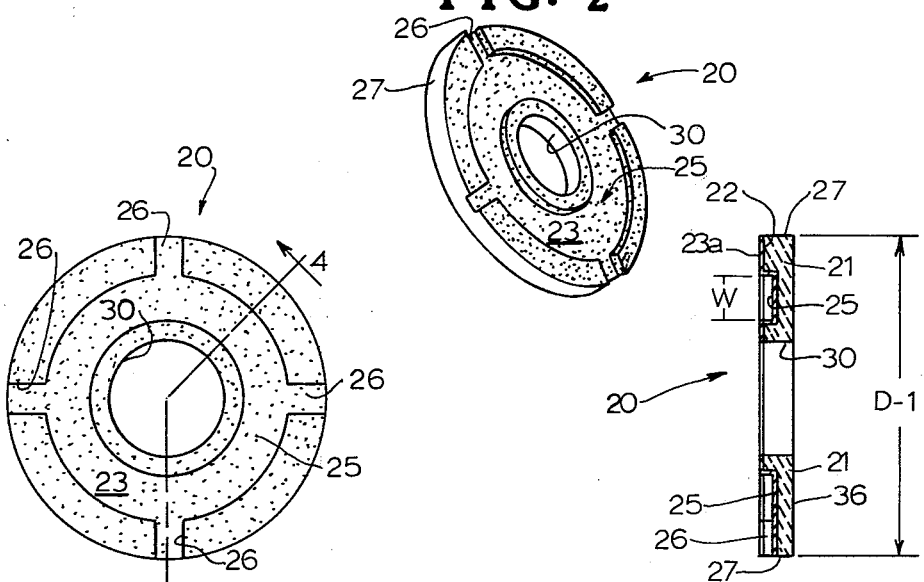

LASER BYPASS INHIBITOR

DESCRIPTION

1. Technical Field

The invention relates to ceramic laser tube constructions and particularly to bypass gas discharge inhibitors associated with such laser tubes.

2. Background Art

It is well known in ion laser design that a gas bypass is needed to maintain pressure stability in a laser tube between the anode and cathode ends. Such a gas bypass counteracts the effects of gas pumping in the bore caused by the discharge current. The purpose of the bypass is to transmit gas between the anode end of the tube and the cathode end without permitting any ionization of the gas which would otherwise cause a gas discharge in the bypass. The gas conductivity should be high enough to maintain a reasonable pressure balance between the tube ends. U.S. Pat. No. 3,763,442 illustrates a laser tube having a gas bypass arrangement.

When a laser tube is ignited, there is usually a means of ionizing the gas and a means of sustaining the ionization with a continuous or pulse current. The ionization is usually provided by a trigger mechanism which exposes the gas to a high RF electric field. This is usually achieved by an external pulsed transformer or a series injection transformer. The ionization is then maintained by a CW or DC field between two electrodes in the tube.

In a ceramic laser tube having an internal gas bypass the gas bypass is usually exposed to the same trigger and run mechanisms as the main discharge bore. In such a condition, the bypass design must either inhibit trigger ionization or discharge maintenance or both. In a prior laser tube configuration, the diameter-to-length ratio of the bypass is kept lower than that of the bore so that the bypass will not sustain a discharge. However, when use and wear has damaged the bore, a discharge can be produced in the bypass holes to inhibit gas ignition. These wires tend to short circuit the fields which induce ionization. Applicant has also tested a metal baffle disc on the cathode end of the bore as a means for inhibiting bypass ignition. However, it was found in tests that the metal baffle disc got too hot and some melting and ion sputtering occurred.

DISCLOSURE OF INVENTION

The ceramic assembly of the invention is formed of a ceramic disc having a central aperture and with one side of the disc metalized and formed with a concentric channel and communicating radial channels. The metalized side of the assembly is metal bonded to the end of a ceramic laser tube having a main bore mated to the central aperture of the disc and bypass gas bores mated to the channels formed in the metalized side of the disc thereby reducing the tendency of the bypass gas to ignite without substantially reducing passage of the bypass gas. The gas inhibitor of the invention may also be employed with wires inserted in the bypass gas bores to further inhibit gas ignition.

DESCRIPTION OF THE DRAWINGS

FIG. 1 is a partial sectional view of a ceramic laser tube and end shroud with a gas bypass inhibitor ceramic disc assembly mounted according to the invention.

FIG. 2 is a perspective view of the metalized and channel formed side surface of the gas bypass inhibitor disc assembly of the invention.

FIG. 3 is a plane view of the disc assembly.

FIG. 4 is a sectional view taken along line 4—4 of FIG. 3.

BEST MODE FOR CARRYING OUT THE INVENTION

In FIG. 1 there is illustrated a conventional ceramic gas laser tube 10 having a main bore 11 with an outwardly tapered discharge end 13 and plural gas bypass bores 14. Adjacent supporting structure 15, a conventional metal end shroud 16 has its end portion 17 metal bonded to tube 10 adjacent the tapered end 18 thereof. While not shown, it should be recognized that appropriate cathode structure mounts within end shroud 16. Also to be recognized is the fact that the space within end shroud 16 is conventionally part of the vacuum envelope of the overall laser assembly not otherwise deemed necessary for illustration.

The bypass gas inhibitor of the invention comprises a circular ceramic disc assembly 20 made up of a circular ceramic disc body 21. One side 22 of disc body 21 is metalized with a thin, metallic film 23 comprising nickel or a like metallic coating suited by nature and thickness to forming a highly electrically conducting and protective coating. Thus, the coating thickness applied to side 22 of disc body 21 will vary dependent on the nature of the metallic material chosen for the coating.

In addition to having the side 22 metalized as described, the same side 22 is formed with both a circular channel 25 and four connecting radial channels 26. Channel 25 is concentric with the central aperture 30 of assembly 20 and channels 26 radiate outwardly therefrom. While other channel configurations could be formed, the illustrated channel configuration has been found especially suited to the purposes of the invention. The outside diameter D-1 of disc assembly 20 is designed to be somewhat less in size than the illustrated inside diameter D-2 of the end shroud 16 so as to avoid contact between the non-metalized peripheral surface 27 of the disc body 21 and the internal metal surface of end shroud 16 so that the bypass gases can enter the cathode region.

Disc assembly 20 is mounted on the end of tube 10 with the metalized surface 23 bonded to the end 35 of tube 10 which is also metalized so as to insure the obtaining of a solid, electrically conducting film bond between tube 10 and the metalized size surfaces 23a of disc assembly 20. Disc assembly 20 in the secured position mates the central aperture 30 of disc assembly 20 to the tapered end of tube 10 and mates the concentric channel 25 with the gas bypass bores 14. The central aperture 30 is made somewhat larger than the end diameter of the laser tube tapered discharge end 13 so as to insure free passage of the main bore discharge. Also, it is desirable that the width W of the concentric channel 25 be substantially wider than the inside diameter of the bypass gas bores 14 so as to also insure free passage of the bypass gas.

In use, the non-metalized ceramic side surface 36 would be exposed to the main and bypass gas bore discharges. The metalized surfaces formed on channels 25, 26 during laser operation thus provide an electrically conducting surfaced guide means for electrically and physically restricting the bypass gas from sustaining a discharge in the bypass channels 25, 26 as well as in the bypass gas bores 14 while permitting conduction of the un-ionized bypass gas along the metalized channel surfaces provided by channels 25, 26. Further, the non-metalized ceramic surface 36 in contact with the ionized gas tends not to induce ion sputtering and therefore tends to eliminate tube contamination. As a means of further inhibiting the bypass gas discharge, the invention also recognizes the optional use of wires 50, in the gas bypass bores 14 according to conventional practice.

While not illustrated, those skilled in the art will appreciate that within the invention other means, e.g., metallic, ceramic or combinations thereof, could be mounted adjacent the cathode end of the tube for establishing metal surfaced paths within the laser tube vacuum envelope but external of tube 10 for inhibiting discharge within the gas bypass bores as well as within the paths. In addition, such means, while explained in reference to the cathode end, could be applied to the anode end of the tube as well.

I claim:

1. In a laser adapted to provide a laser bypass inhibiting means attached to but not constituting a part of the laser bore assembly, in combination:
   (a) a cylindrical-shaped ceramic laser tube having a central main discharge bore and surrounding gas bypass bores running lengthwise thereof and having outlets at one end thereof;
   (b) a metal formed end shroud metallically bonded to said end of said tube and surrounding said outlets for reception of related structure therein;
   (c) a gas inhibitor assembly secured to said tube within said end shroud comprising a ceramic disc having an outside diameter less than the inside diameter of said shroud at said end to provide space therebetween and having:
      (i) a central aperture mated to said main bore outlet;
      (ii) a metalized surface on one side bonded to said end of said tube having said outlets; and
      (iii) metalized channel formations in said metalized side of said disc communicating said gas bypass bore outlets with said space within said end shroud enabling bypass gas from said bypass bore outlets to be channeled through metallic surfaced paths within said disc and outward to said space within said end shroud, said metallic surfaced paths being effective to prevent ionization of bypass gas exiting therethrough whereby to inhibit ignition of the bypass gas in said tube bypass gas bores and within said channel formations.

2. In a laser as claimed in claim 1 wherein said channel formations comprise an annular channel concentric with said disc central aperture and radial channels extending outwardly from and communicating said annular channel with said space.

3. In a laser as claimed in claim 2 wherein the width of said annular channel formation and the diameter of said central aperture are made sufficiently large to avoid any obstruction of said main bore and gas bypass bore outlets at said tube end.

4. In a laser as claimed in claim 1 wherein said end is the cathode end and said related structure is cathode end related structure.

5. In a laser adapted to provide a laser bypass inhibiting means attached to but not constituting a part of the laser bore assembly, in combination:
   (a) a ceramic laser tube having a central main discharge bore and surrounding gas bypass bores running lengthwise thereof and having outlets within a vacuum envelope and at one end thereof; and
   (b) gas inhibitor means mounted adjacent said end of said tube within said vacuum envelope and formed of a structure providing metallic surfaced channels arranged to communicate said gas bypass bore outlets with said envelope to receive and channel bypass gas exiting said bypass bore outlets through metallic surfaced paths having exit ends within said vacuum envelope, said metallic surfaced paths being effective to prevent ionization of bypass gas exiting therethrough whereby to inhibit ignition of the bypass gas residing in said tube bypass gas bores and within said paths.

6. In a laser as claimed in claim 5 wherein said end comprises the cathode end of said tube and said outlets are at said cathode end.

* * * * *